US009825549B2

(12) United States Patent
Choi et al.

(10) Patent No.: US 9,825,549 B2
(45) Date of Patent: Nov. 21, 2017

(54) MULTI-LEVEL INVERTER

(71) Applicant: LSIS CO., LTD., Gyeonggi-do (KR)

(72) Inventors: Seung-Cheol Choi, Gyeonggi-do (KR); An-No Yoo, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/086,704

(22) Filed: Mar. 31, 2016

(65) Prior Publication Data

US 2016/0301322 A1 Oct. 13, 2016

(30) Foreign Application Priority Data

Apr. 9, 2015 (KR) .................. 10-2015-0050143

(51) Int. Cl.
*H02M 7/483* (2007.01)
*H02M 7/487* (2007.01)
*H02M 5/458* (2006.01)
*H02M 1/32* (2007.01)
*H02M 7/49* (2007.01)
(Continued)

(52) U.S. Cl.
CPC ............. *H02M 5/458* (2013.01); *H02M 1/32* (2013.01); *H02M 7/487* (2013.01); *H02M 7/49* (2013.01); *H02M 2001/325* (2013.01)

(58) Field of Classification Search
CPC .......... H02M 7/44; H02M 7/48; H02M 7/483; H02M 7/53; H02M 7/537; H02M 7/5387
See application file for complete search history.

(56) References Cited

U.S. PATENT DOCUMENTS 6,369,543 B1    4/2002  Masselus et al.
8,750,005 B2 *  6/2014  Fujii .................. H02M 7/487
                                                        363/132
(Continued)

FOREIGN PATENT DOCUMENTS

CN    104410260 A    3/2015
EP      2119587 A1  11/2009
(Continued)

OTHER PUBLICATIONS

Maharjan, et al., "Fault-Tolerant Operation of a Battery-Energy-Storage System Based on a Multilevel Cascade PWM Converter With Star Configuration", IEEE Transactions on Power Electronics, vol. 25, No. 9, Sep. 2010.

(Continued)

*Primary Examiner* — Gary L Laxton
(74) *Attorney, Agent, or Firm* — Nath, Goldberg & Meyer; Jerald L. Meyer

(57) ABSTRACT

The present disclosure relates to a multi-level inverter capable of performing a bypass operation without adding any separate module. The multi-level inverter includes a first capacitor and a second capacitor coupled in series to each other, a plurality switches for generating a multi-level output voltage by using a voltage charged in the first capacitor and the second capacitor and a plurality of diodes respectively coupled in parallel to the plurality of switches, a first output terminal and a second output terminal for outputting the output voltage, and a controller for switching a state of each of the plurality of switches to an on or off state according to one of predetermined bypass modes, thereby interrupting the output of the output voltage through the first output terminal and the second output terminal.

6 Claims, 8 Drawing Sheets

(56) References Cited

U.S. PATENT DOCUMENTS

| | | | |
|---|---|---|---|
| 9,209,707 B2* | 12/2015 | Park | H02J 3/385 |
| 9,270,222 B2 | 2/2016 | Yoo | |
| 2004/0240237 A1 | 12/2004 | Okayama et al. | |
| 2013/0014384 A1 | 1/2013 | Xue et al. | |
| 2013/0264876 A1* | 10/2013 | Paakkinen | H02M 7/53871 |
| | | | 307/52 |
| 2014/0043873 A1 | 2/2014 | Blomberg | |
| 2014/0268928 A1* | 9/2014 | Wei | H02M 5/458 |
| | | | 363/37 |

FOREIGN PATENT DOCUMENTS

| | | |
|---|---|---|
| EP | 2 822 164 A2 | 1/2015 |
| EP | 2 840 706 A2 | 2/2015 |
| JP | 2002-502219 A | 1/2002 |
| JP | 2004-357427 A | 12/2004 |
| JP | 2005-33891 A | 2/2005 |
| JP | 2008-220045 A | 9/2008 |
| JP | 2009-296858 A | 12/2009 |
| JP | 2013-236488 A | 11/2013 |
| KR | 10-2015-0004026 A | 1/2015 |

OTHER PUBLICATIONS

Nami, et al., "A new T-type NPC-based submodule for Modular Multilevel Cascaded Converters", The 5th Power Electronics, Drive Systems and Technologies Conference (PEDSTC 2014), Feb. 2014.

European Search Report dated Oct. 5, 2016 issued in corresponding European Application No. 16 16 0137.

* cited by examiner

PRIOR ART

PRIOR ART

MULTI-LEVEL INVERTER

CROSS REFERENCE TO RELATED APPLICATION

This application claims the benefit of Korean Patent Application No. 10-2015-0050143, filed on Apr. 9, 2015, which is hereby incorporated by reference in its entirety.

BACKGROUND

1. Technical Field

The present disclosure relates to a multi-level inverter, and more particularly, to a multi-level inverter capable of performing a bypass operation without adding any separate module.

2. Description of the Related Art

A medium voltage inverter is an inverter having an input power whose root mean square (RMS) value is over 600V for a line-to-line voltage. The rating power capacity of the medium voltage inverter ranges from a few hundreds of kilowatts to a few tens of megawatts. Various medium voltage inverters are widely used in application fields including fans, pumps, and compressors. Among these medium voltage inverters, a cascaded multi-level inverter is frequently used, which generates an output phase voltage having three or more levels. The magnitude and number of levels of the output phase voltage generated from the cascaded multi-level inverter are determined according to the number of unit cells constituting the cascaded multi-level inverter.

Each phase of the cascaded multi-level inverter is formed by coupling a plurality of unit cells in series, and the three-phase output voltage of the inverter is determined by adding output voltages of unit cells constituting each phase of the inverter. If one of a plurality of unit cells included in a multi-level inverter is abnormal, the inverter can perform a bypass operation performed in a state in which an output is reduced. In the bypass operation, the abnormal unit cell is not used by short-circuiting an output terminal of the unit cell through a bypass switch, and only the other normal unit cells are used, thereby performing a normal operation of the inverter.

However, in an inverter having no bypass switch for controlling a bypass operation for each unit cell, a DC-link voltage increases due to rectification of an inverse-parallel diode of a power switch used in an abnormal unit cell. Therefore, the DC-link voltage exceeds the rating operating range of a DC-link capacitor. As a result, unit cells are damaged, and all operations of the inverter cannot be performed.

SUMMARY

It is an aspect of some embodiments to provide a multi-level inverter capable of performing a bypass operation without adding any bypass switch for controlling a bypass operation for each unit cell.

It is an aspect of some embodiments to provide a multi-level inverter capable of performing an individual bypass operation according to the kind of an abnormal switch among a plurality of switches included in a unit cell.

The present disclosure is not limited to the above aspect and other aspects of the present disclosure will be clearly understood by those skilled in the art from the following description.

In accordance with one aspect of some embodiments, a multi-level inverter includes a first capacitor and a second capacitor coupled in series to each other, a plurality switches for generating a multi-level output voltage by using a voltage charged in the first capacitor and the second capacitor and a plurality of diodes respectively coupled in parallel to the plurality of switches, a first output terminal and a second output terminal for outputting the output voltage, and a controller for switching a state of each of the plurality of switches to an on or off state according to one of predetermined bypass modes, thereby interrupting the output of the output voltage through the first output terminal and the second output terminal.

DETAILED DESCRIPTION

Figure 1:
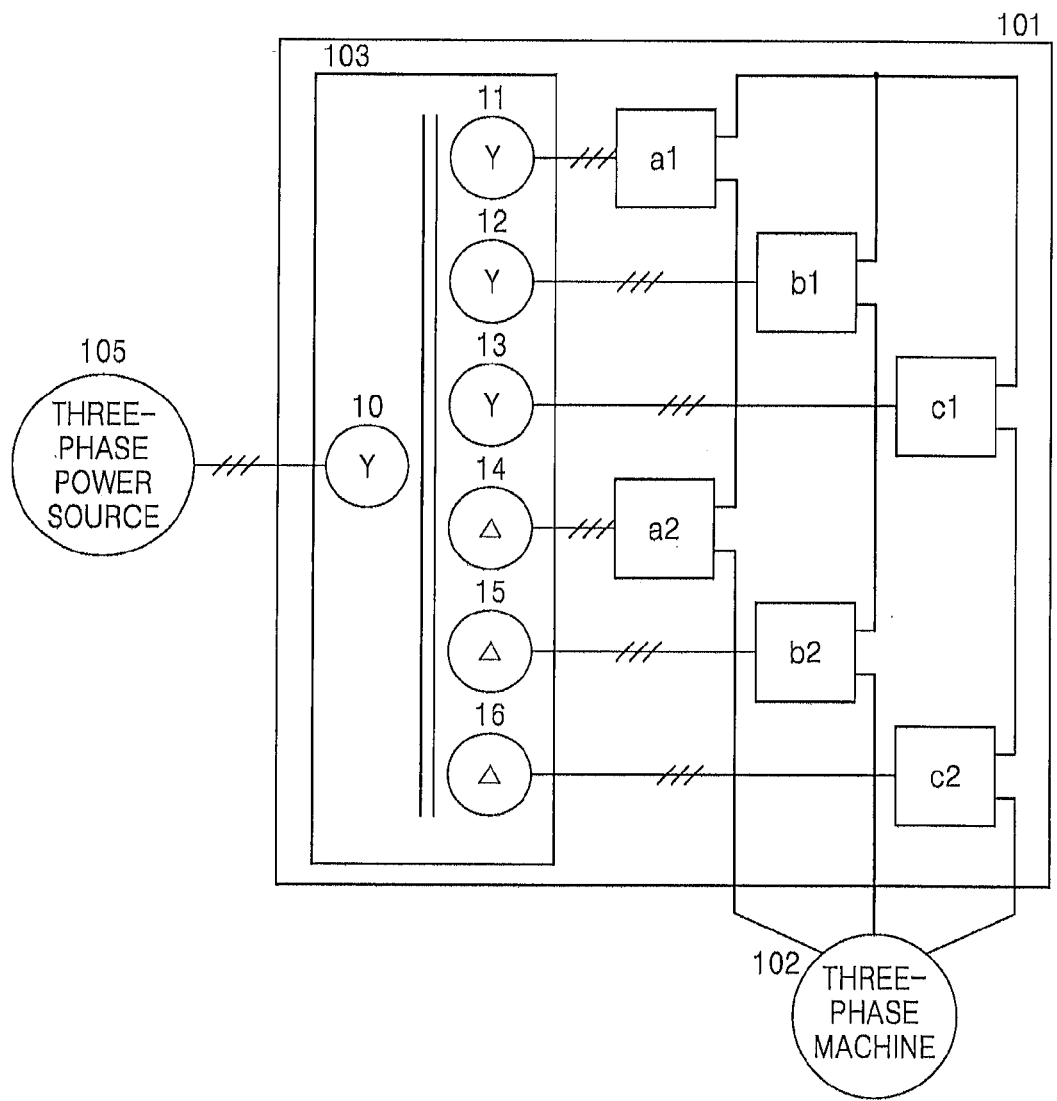
FIG. 1 is a configuration diagram of a cascaded multi-level inverter.

Hereinafter, disclosed embodiments will be described in detail with reference to the accompanying drawings. It should be understood that the present disclosure is not limited to the following embodiments, and that the embodiments are provided for illustrative purposes only. The scope of the disclosure should be defined only by the accompanying claims and equivalents thereof. In the drawings, like reference numerals designate identical or corresponding parts throughout the several views.

FIG. 1 is a configuration diagram of a cascaded multi-level inverter.

The cascaded multi-level inverter 101 shown in FIG. 1 is configured with unit cells a1, b1, c1, a2, b2, and c2 in two stages, but the number of unit cells may vary depending on system requirements. Each of the unit cells a1, b1, c1, a2, b2, and c2 has an independent single-phase inverter structure. As shown in FIG. 1, the unit cells a1, b1, c1, a2, b2, and c2 are coupled in series, thereby obtaining a high voltage.

The inverter 101 is supplied with, for example, a three-phase AC power whose root mean square (RMS) value is over 600V for a line-to-line voltage through a three-phase power source 105. The three-phase AC power supplied by the three-phase power source 105 is input to a phase shift transformer 103. The transformer 103 isolates the input three-phase AC power, and transforms the phase and magnitude of a voltage of the three-phase AC power to fit requirements of the unit cells a1, b1, c1, a2, b2, and c2. The transformer 103 improves the total harmonic distortion (THD) of the input three-phase AC power through phase shift. The transformer 103 includes a primary winding 10 and secondary windings 11, 12, 13, 14, 15, and 16 having different phases.

The unit cells a1, b1, c1, a2, b2, and c2 output voltages by using voltages output from the transformer 103, respectively. The inverter 101 adds output voltages of unit cells corresponding to each phase among the unit cells a1, b1, c1, a2, b2, and c2, thereby outputting a final output voltage to be input to a three-phase machine 102. Here, the three-phase machine 102 may be a high-voltage three-phase machine such as an induction machine or a synchronous machine.

The inverter 101 configured as shown in FIG. 1 outputs an output voltage of three phases, i.e., phases a, b, and c. For example, an output voltage of the phase a is a voltage obtained by adding output voltages of the unit cells a1 and a2 coupled in series. An output voltage of the phase b is a voltage obtained by adding output voltages of the unit cells b1 and b2 coupled in series. An output voltage of the phase c is a voltage obtained by adding output voltages of the unit cells c1 and c2 coupled in series.

The output voltages of the three phases, output from the inverter 101, have the same magnitude but have a phase difference of 120 degrees. Thus, the number of unit cells constituting the inverter 101 varies, and the unit cells are differently controlled, so that it is possible to improve THDs, and voltage variations dv/dt of output voltages applied to the machine 102.

Figure 2:
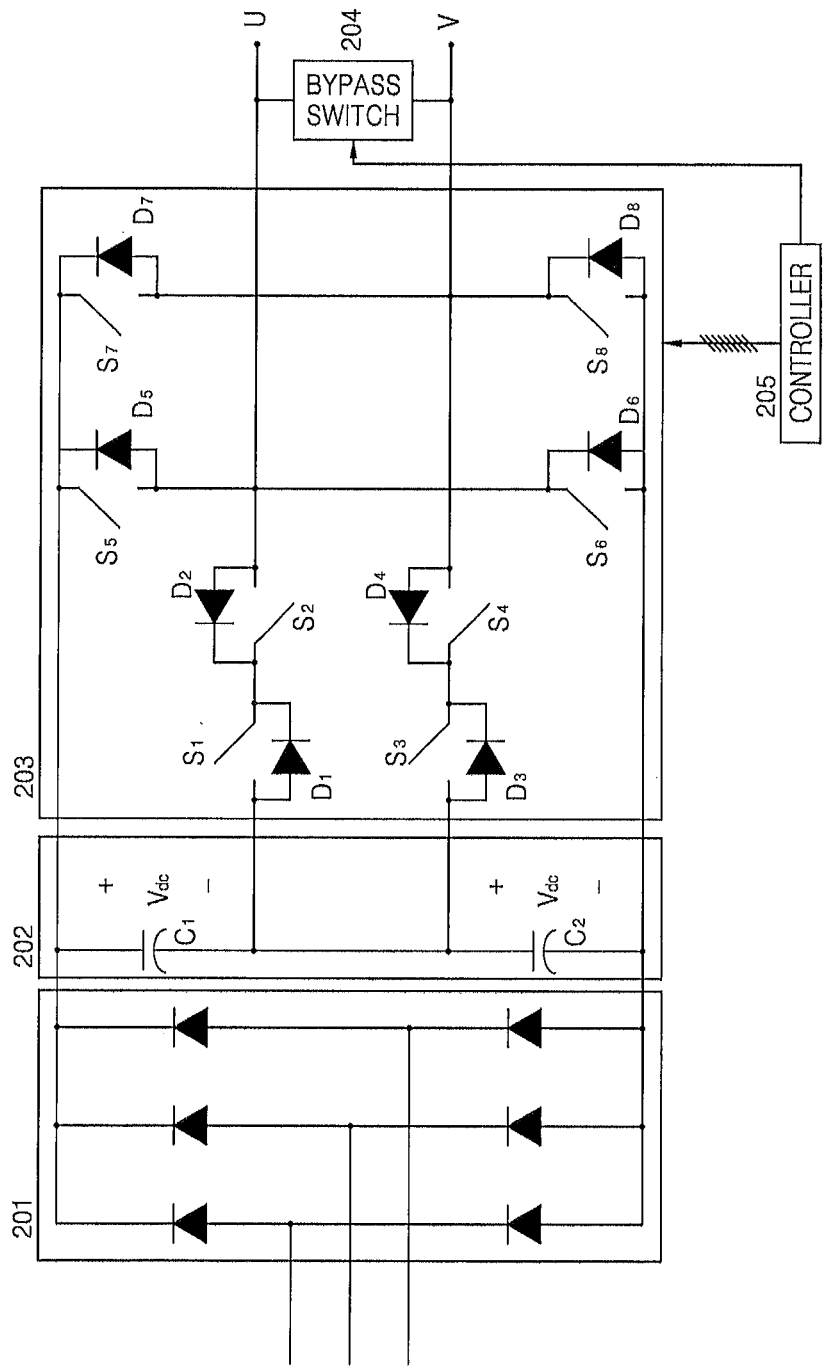
FIG. 2 is a configuration diagram of a unit cell according to a conventional art.

FIG. 2 is a configuration diagram of a unit cell among the unit cells a1, b1, c1, a2, b2, and c2 included in the inverter 101 shown in FIG. 1 according to a conventional art.

Referring to FIG. 2, the unit cell includes a rectifier 201, a smoother 202, and an output voltage generator 203.

The rectifier 201 is configured with six diodes as shown in FIG. 2. The rectifier 201 receives a three-phase power output from the transformer 103 shown in FIG. 1, and rectifies the input three-phase power to a DC power.

The DC power rectified by the rectifier 201 is transmitted to two capacitors, i.e., a first capacitor C1 and a second capacitor C2 coupled in series to each other. The first capacitor C1 and the second capacitor C2 have the same capacitance. Accordingly, the first capacitor C1 and the second capacitor C2 are charged with a voltage $V_{dc}$ having the same magnitude.

The output voltage generator 203 includes a plurality of diodes D1, D2, D3, D4, D5, D6, D7, and D8. The diodes D1, D2, D3, D4, D5, D6, D7, and D8 constituting the output voltage generator 203 are coupled in parallel to corresponding switches S1, S2, S3, S4, S5, S6, S7, and S8, respectively. A controller 205 outputs a control signal to switch the state of each of the switches S1, S2, S3, S4, S5, S6, S7, and S8 to an on or off state. Here, that the state of the switch is switched to the on state means that the switch is closed, and that the state of the switch is switched to the off state means that the switch is opened. The controller 205 controls an on or off operation of each of the switches S1, S2, S3, S4, S5, S6, S7, and S8 through the control signal, thereby generating a multi-level output voltage. The controller 205 outputs the generated output voltage through a first output terminal U and a second output terminal V.

An output voltage $V_{UV}$ of the unit cell, output through the first and second output terminals U and V of FIG. 2 is determined, as shown in Equation 1, by a pole voltage $V_U$ of the first output terminal U and a pole voltage $V_V$ of the second output terminal V.

$$V_{UV} = V_U - V_V \quad \text{Equation 1}$$

Here, the pole voltage $V_U$ of the first output terminal U and the pole voltage $V_V$ of the second output terminal V are determined, as shown in Table 1, by complimentary on/off states of the switches S1, S2, S3, S4, S5, S6, S7, and S8, which are switched by the controller 205.

TABLE 1

| State of Switch (U Phase) | Pole Voltage ($V_U$) | State of Switch (V Phase) | Pole Voltage ($V_V$) |
|---|---|---|---|
| Turn-on of S2 and S5 | $V_{dc}$ | Turn-on of S4 and S7 | $V_{dc}$ |
| Turn-on of S1 and S2 | 0 | Turn-on of S3 and S4 | 0 |
| Turn-on of S1 and S6 | $-V_{dc}$ | Turn-on of S3 and S8 | $-V_{dc}$ |

Figure 3:
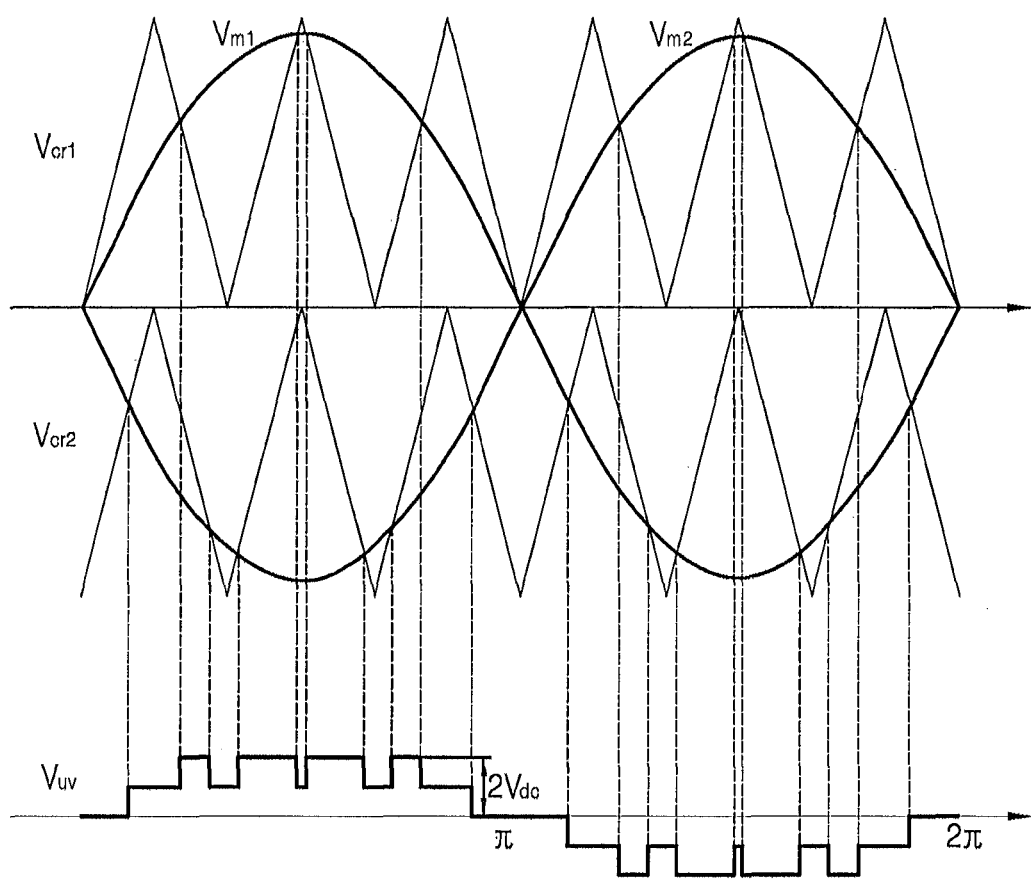
FIG. 3 shows waveforms of control signals for controlling a plurality of diodes included in a unit cell to form a multi-level output voltage and magnitudes of the output voltage corresponding to the waveforms.

FIG. 3 shows waveforms of control signals for controlling a plurality of diodes included in a unit cell to form a multi-level output voltage and magnitudes of the output voltage corresponding to the waveforms. The waveforms of the control signals shown in FIG. 3 are obtained by using an in-phase disposition (IPD) modulation technique.

Referring to FIG. 3, instruction voltages $V_{m1}$ and $V_{m2}$ with respect to both poles of the unit cell have the same frequency and magnitude but have a phase difference of 180 degrees. Also, carrier waves $V_{cr1}$ and $V_{cr2}$ with respect to both the poles of the unit cell having the same frequency and magnitude but have different offset values.

When the instruction voltages and the carrier waves are generated as shown in FIG. 3, the controller 205 generates control signals for the switches S1 and S5 and the switches S3 and S7 at intersection points of the carrier wave $V_{cr1}$ and the instruction voltages $V_{m1}$ and $V_{m2}$, and generates control signals for the switches S2 and S6 and the switches S4 and S8 at intersection points of the carrier wave $V_{cr2}$ and the instruction voltages $V_{m1}$ and $V_{m2}$.

According to the generation of the control signals, the unit cell of FIG. 2 can generate an output voltage $V_{uv}$ having five levels $2V_{dc}$, $V_{dc}$, 0, $-V_{dc}$, and $-2V_{dc}$ as shown at the bottom end of FIG. 3 by using a pole voltage having three levels $V_{dc}$, 0, and $-V_{dc}$ as shown in Table 1.

Meanwhile, when the output of a normal voltage from the unit cell of FIG. 2 is impossible due to abnormality of the unit cell, the output of a voltage from the unit cell was conventionally interrupted through a bypass switch 204 shown in FIG. 2. That is, if the unit cell is abnormal, the controller 205 applies a bypass signal to the bypass switch 204. Accordingly, the bypass switch 204 short-circuits the first output terminal U and the second output terminal V, so that the output voltage of the unit cell becomes 0V. The output of a voltage from the unit cell is interrupted by the above-described operation of the bypass switch 204. The switches S1, S2, S3, S4, S5, S6, S7, and S respectively corresponding to the diodes D1, D2, D3, D4, D5, D6, D7, and D8 of the bypassed unit cell are turned off so as to prevent an arm short circuit.

The inverter according to the conventional art is to be provided with a bypass switch for each unit cell so as to interrupt the output of a voltage from a unit cell when the unit cell is abnormal. However, when the bypass switch is provided for each unit cell, the unit cell increases due to the disposition of the bypass switches configured with elements such as magnetic conductors (MC). Therefore, as the number of bypass switches disposed in the unit cell increases, the manufacturing cost of the inverter increases.

Some embodiments are conceived to solve this problem, and relates to a multi-level inverter capable of performing a bypass operation when a unit cell is abnormal, without using the bypass switch shown in FIG. 2.

Figure 4:
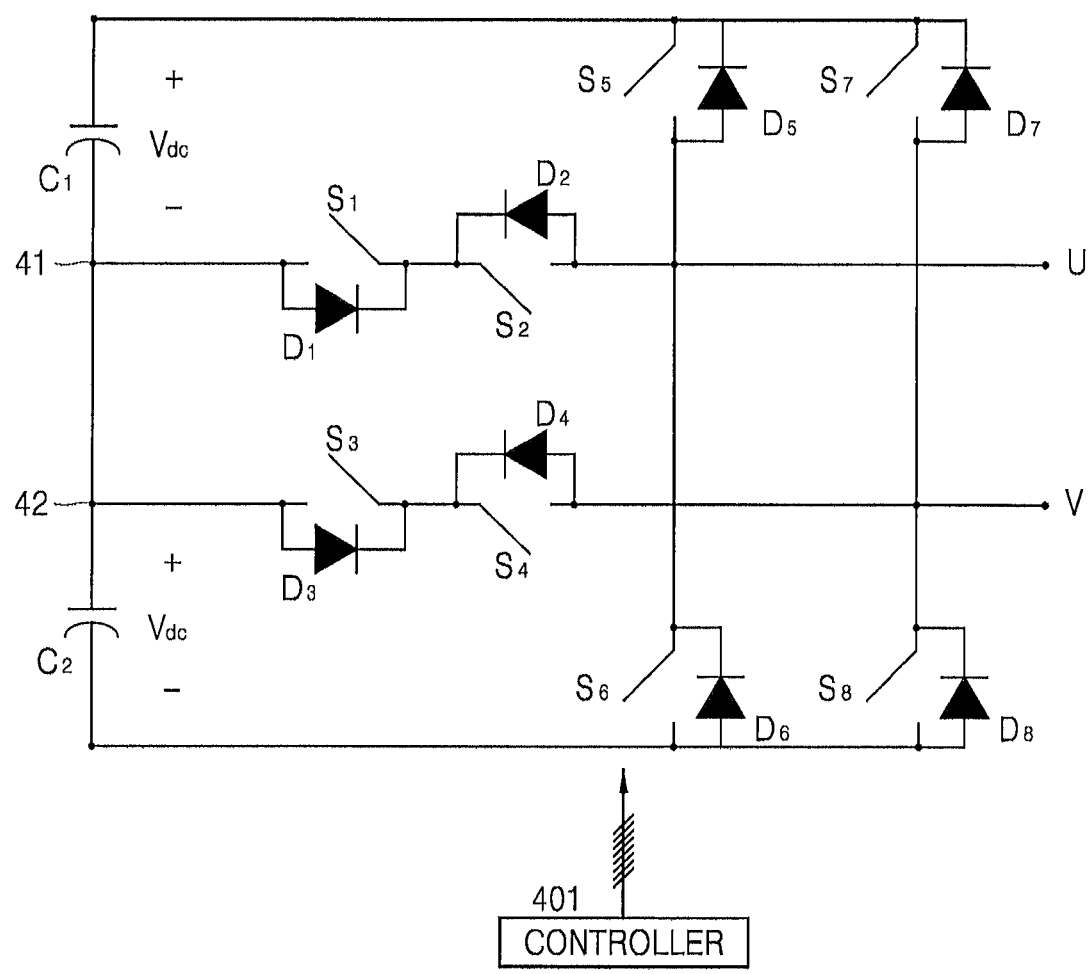
FIG. 4 is a configuration diagram of a unit cell according to an embodiment.

FIG. 4 is a configuration diagram of a unit cell according to an embodiment. For reference, the unit cell according to the embodiment may include the rectifier 201 shown in FIG. 2. However, for convenience of illustration, the configuration of the rectifier is omitted in FIG. 4.

Referring to FIG. 4, the unit cell according to the embodiment includes a first capacitor C1, a second capacitor C2, first to eighth diodes D1, D2, D3, D4, D5, D6, D7, and D8, first to eighth switches S1, S2, S3, S4, S5, S6, S7, and S8, and a controller 401.

In FIG. 4, the first switch S1 and the second switch S2 are disposed between a first output terminal U and a connection point 41 of the first capacitor C1 and the second capacitor C2. The first switch S1 and the second switch S2 are coupled in series to each other.

The third switch S3 and the fourth switch S4 are disposed between a second output terminal V and a connection point 42 of the first capacitor C1 and the second capacitor C2. The third switch S3 and the fourth switch S4 are coupled in series to each other.

The fifth switch S5 and the sixth switch S6 are coupled in parallel to the first capacitor C1 and the second capacitor C2. The fifth switch S5 and the sixth switch S6 are coupled in series to each other.

The seventh switch S7 and the eighth switch S8 are coupled in parallel to the first capacitor C1 and the second capacitor C2. The seventh switch S7 and the eighth switch S8 are coupled in series to each other.

As shown in FIG. 4, the fifth switch S5 and the seventh switch S7 are coupled to a positive (+) electrode of the DC-link voltage capacitor (first capacitor C1), and the sixth switch S6 and the eighth switch S8 are coupled to a negative (−) electrode of the DC-link voltage capacitor (second capacitor C2).

In the unit cell shown in FIG. 4, functions of the first capacitor C1, the second capacitor C2, the first to eighth diodes D1, D2, D3, D4, D5, D6, D7, and D8, and the first to eighth switches S1, S2, S3, S4, S5, S6, S7, and S8 and a process of generating an output voltage corresponding to a control signal of the controller 401 are the same as those in the conventional unit cell. However, unlike the conventional unit cell shown in FIG. 2, the unit cell according to the embodiment is provided with no bypass switch as shown in FIG. 4.

In the embodiment, the controller 401 switches, to on and off states, states of the first to eighth switches S1, S2, S3, S4, S5, S6, S7, and S8 respectively coupled in parallel to the first to eighth diodes D1, D2, D3, D4, D5, D6, D7, and D8, according to one of predetermined bypass modes, so that it is possible to interrupt the output of an output voltage through the first output terminal U and the second output terminal V.

Hereinafter, first to third bypass modes according to an embodiment will be described with reference to FIGS. 5 to 7.

Figure 5:
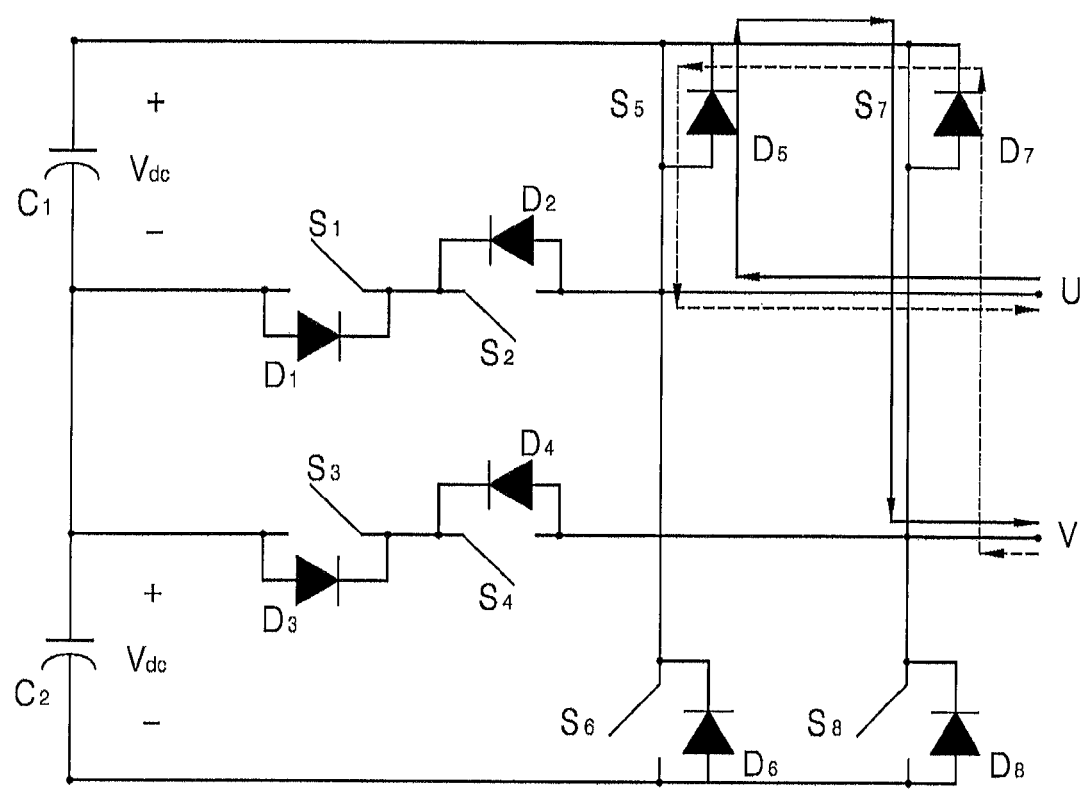
FIG. 5 shows a bypass operation of the unit cell in a first bypass mode according to an embodiment.

FIG. 5 shows a bypass operation of the unit cell in a first bypass mode according to an embodiment.

In the first bypass mode according to the embodiment, the controller 401, as shown in FIG. 5, switches, to the on state, the states of only the fifth switch S5 corresponding to the fifth diode D5 and the seventh switch S7 corresponding to the seventh diode D7, and switches, to the off state, the states of the switches S1 to S4, S6, and S8 respectively corresponding to the other diodes D1 to D4, D6, and D8. Accordingly, current flows in a direction indicated by an arrow (solid line) when the direction of the current is a positive (+) direction, and flows in a direction indicated by an arrow (dotted line) when the direction of the current is a negative (−) direction, thereby interrupting the output of a voltage from the unit cell. The first bypass mode may be performed when the fifth diode D5, the seventh diode D7, the fifth switch S5, and the seventh switch S7 are normally operated.

Figure 6:
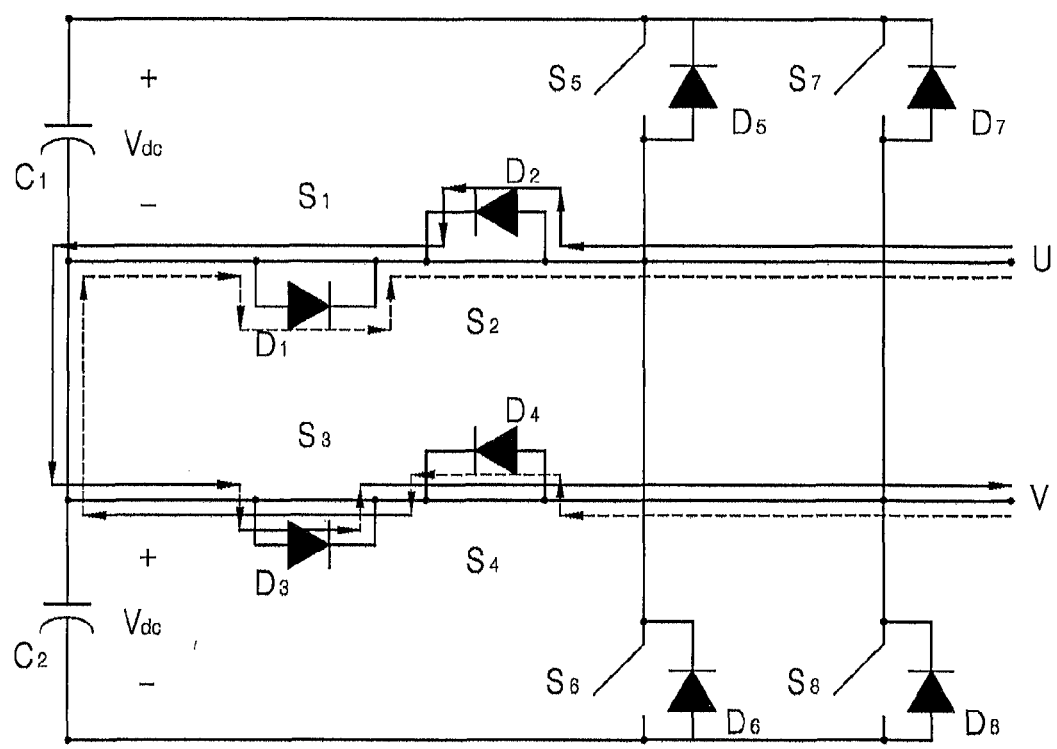
FIG. 6 shows a bypass operation of the unit cell in a second bypass mode according to an embodiment.

FIG. 6 shows a bypass operation of the unit cell in a second bypass mode according to an embodiment.

In the second bypass mode according to the embodiment, the controller 401, as shown in FIG. 6, switches, to the on state, the states of only the first switch S1, the second switch S2, the third switch S3, and the fourth switch S4, respectively corresponding to the first diode D1, the second diode D2, the third diode D3, and the fourth diode D4, and switches, to the off state, the states of the switches S5 to S8 respectively corresponding to the other diodes D5 to D8. Accordingly, current flows in a direction indicated by an arrow (solid line) when the direction of the current is a positive (+) direction, and flows in a direction indicated by an arrow (dotted line) when the direction of the current is a negative (−) direction, thereby interrupting the output of a voltage from the unit cell. The second bypass mode may be performed when the first diode D1, the second diode D2, the third diode D3, the fourth diode D4, the first switch S1, the second switch S2, the third switch S3, and the fourth switch S4 are normally operated.

Figure 7:
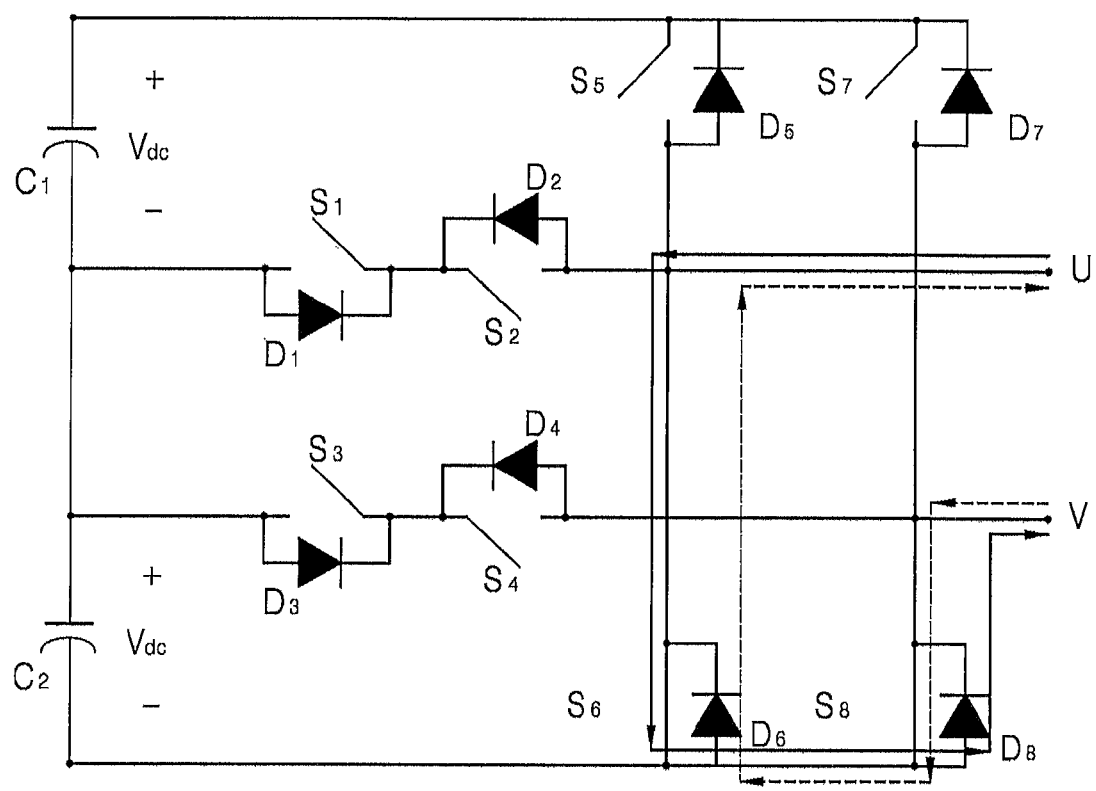
FIG. 7 shows a bypass operation of the unit cell in a third bypass mode according to an embodiment.

FIG. 7 shows a bypass operation of the unit cell in a third bypass mode according to an embodiment.

In the third bypass mode according to the embodiment, the controller 401, as shown in FIG. 6, switches, to the on state, the states of only the sixth switch S6 corresponding to the sixth diode D6 and the eighth switch S8 corresponding to the eighth diode D8, and switches, to the off state, the states of the switches S1 to S5 and S7 respectively corresponding to the other diodes D1 to D5 and D7. Accordingly, current flows in a direction indicated by an arrow (solid line) when the direction of the current is a positive (+) direction, and flows in a direction indicated by an arrow (dotted line) when the direction of the current is a negative (−) direction, thereby interrupting the output of a voltage from the unit cell. The third bypass mode may be performed when the sixth diode D6, the eighth diode D8, the sixth switch S6, and the eighth switch S8 are normally operated.

In the embodiment, the controller 401 may detect whether at least one of the first to eighth diodes D1, D2, D3, D4, D5, D6, D7, and D8 and the first to eighth switches S1, S2, S3, S4, S5, S6, S7, and S8 is abnormal. If it is detected that at least one of the first to eighth diodes D1, D2, D3, D4, D5, D6, D7, and D8, and the first to eighth switches S1, S2, S3, S4, S5, S6, S7, and S8 is abnormal, the controller 401 determines a bypass mode to be applied to the unit cell according to the kind of an abnormal diode or switch. Then, the controller 401 switches states of predetermined switches to the on state and switches states of the other switches to the off state according to the determined bypass mode, so that the magnitude of an output voltage through the first output terminal U and the second output terminal V becomes 0V.

In the embodiment, when at least one of the first diode D1, the second diode D2, the third diode D3, the fourth diode D4, the first switch S1, the second switch S2, the third switch S3, and the fourth switch S4 is abnormal, the controller 401 switches states of predetermined switches to the on state according to the first bypass mode or the third bypass mode, thereby interrupting the output of a voltage through the first output terminal U and the second output terminal V.

In the embodiment, when at least one of the fifth diode D5, the seventh diode D7, the fifth switch S5, and the seventh switch S7 is abnormal, the controller 401 switches states of predetermined switches to the on state according to the second bypass mode or the third bypass mode, thereby interrupting the output of a voltage through the first output terminal U and the second output terminal V.

In the embodiment, when at least one of the sixth diode D6, the eighth diode D8, the sixth switch S6, and the eighth switch S8 is abnormal, the controller 401 switches states of predetermined switches to the on state according to the first bypass mode or the second bypass mode, thereby interrupting the output of a voltage through the first output terminal U and the second output terminal V.

Figure 8:
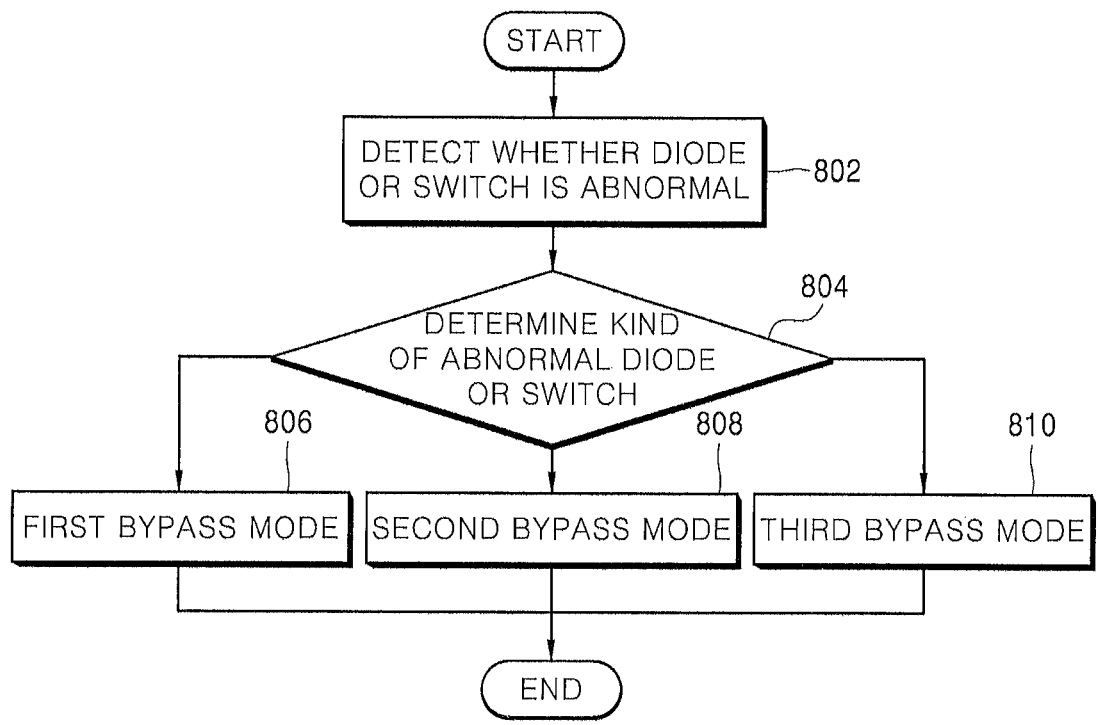
FIG. 8 is a flowchart illustrating a process in which a controller controls the unit cell according to an embodiment.

FIG. 8 is a flowchart illustrating a process in which the controller controls the unit cell according to an embodiment.

Referring to FIG. 8, the controller 401 first detects whether a plurality of diodes or a plurality of switches corresponding to the respective diodes, included in the unit cell of the inverter, are abnormal (802). If it is determined that at least one of the plurality of diode and the plurality of switches corresponding to the respective diodes is abnormal, the controller 401 determines a bypass mode to be applied to the unit cell according to the kind of an abnormal diode or switch (804).

When at least one of the other diodes D1 to D4, D6, and D8 except the fifth diode D5 and the seventh diode D7 and the other switches S1 to S4, S6, and S8 except the fifth switch S5 and the seventh switch S7 is abnormal, the controller 401 interrupts the output of a voltage from the unit cell according to the first bypass mode (806).

When at least one of the other diodes D5 to D8 except the first diode D1, the second diode D2, the third diode D3, and the fourth diode D4 and the other switches S5 to S8 except the first switch S1, the second switch S2, the third switch S3, and the fourth switch S4 is abnormal, the controller 401 interrupts the output of a voltage from the unit cell according to the second bypass mode (808).

When at least one of the other diodes D1 to D5 and D7 except the sixth diode D6 and the eighth diode D8 and the other switches S1 to S5 and S7 except the sixth switch S6 and the eighth switch S8 is abnormal, the controller 401 interrupts the output of a voltage from the unit cell according to the third bypass mode (810).

Accordingly, in some embodiments, when one of switches or diodes included in the multi-level inverter is abnormal, the multi-level inverter performs a bypass operation according to one of the first to third bypass modes, thereby preventing the damage of a unit cell.

As described above, the multi-level inverter according to some embodiments can perform a bypass operation without adding any bypass switch for controlling a bypass operation for each unit cell.

Also, the multi-level inverter according to some embodiments can perform an individual bypass operation according to the kind of an abnormal switch among a plurality of switches included in a unit cell.

While certain embodiments have been described, it will be understood by those skilled in the art that various modifications and changes can be made thereto without departing from the spirit and scope of the disclosure defined by the appended claims.

What is claimed is:

1. A multi-level inverter comprising:
    a first capacitor and a second capacitor coupled in series to each other;
    a plurality of switches for generating a multi-level output voltage by using a voltage charged in the first capacitor and the second capacitor and a plurality of diodes respectively coupled in parallel to the plurality of switches;
    a first output terminal and a second output terminal for outputting an output voltage; and
    a controller for switching a state of each of the plurality of switches to an on or off state according to one of predetermined bypass modes, thereby interrupting the output of the output voltage through the first output terminal and the second output terminal.

2. The multi-level inverter according to claim 1, wherein the plurality of switches include:
    a first switch and a second switch coupled in series between the first output terminal and a connection point of the first capacitor and the second capacitor;
    a third switch and a fourth switch coupled in series between the second output terminal and a connection point of the first capacitor and the second capacitor;
    a fifth switch and a sixth switch coupled in parallel to the first capacitor and the second capacitor, the fifth switch and the sixth switch being coupled in series to each other; and
    a seventh switch and an eighth switch coupled in parallel to the first capacitor and the second capacitor, the seventh switch and the eighth switch being coupled in series to each other.

3. The multi-level inverter according to claim 2, wherein the predetermined bypass modes include:
    a first bypass mode in which the controller switches, to an on state, states of only the fifth switch and the seventh switch, and switches states of other switches to the off state;
    a second bypass mode in which the controller switches, to the on state, states of the first switch, the second switch, the third switch, and the fourth switch, and switches states of the other switches to the off states; and
    a third bypass mode in which the controller switches, to the on state, states of only the sixth switch and the eighth switch, and switches states of the other switches to the off state.

4. The multi-level inverter according to claim 3, wherein, when at least one of a first diode, a second diode, a third diode, a fourth diode, the first switch, the second switch, the third switch, and the fourth switch is abnormal, the controller interrupts the output of the output voltage according to the first bypass mode or the third bypass mode.

5. The multi-level inverter according to claim 3, wherein, when at least one of a fifth diode, a seventh diode, the fifth switch, and the seventh switch is abnormal, the controller interrupts the output of the output voltage according to the second bypass mode or the third bypass mode.

6. The multi-level inverter according to claim 3, wherein, when at least one of a sixth diode, an eighth diode, the sixth switch, and the eighth switch is abnormal, the controller interrupts the output of the output voltage according to the first bypass mode or the second bypass mode.

* * * * *